United States Patent Office 3,785,960
Patented Jan. 15, 1974

3,785,960
REFORMING NAPHTHAS WITH A RHENIUM-GOLD CATALYST
Howard E. Merrill and Robert S. Lunt III, Baton Rouge, La., assignors to Esso Research and Engineering Company
No Drawing. Filed Sept. 30, 1969, Ser. No. 864,277
Int. Cl. C10g 35/08
U.S. Cl. 208—135        14 Claims

ABSTRACT OF THE DISCLOSURE

A process for improving the octane quality of a naphtha by contacting the said naphtha at reforming conditions with a highly active catalyst composite including a porous support and catalytically active amounts of rhenium and gold.

---

Rhenium, a Group VII-B metal thus falling within the range of Groups V-B through VIII transition metals, of the Periodic Table of the Elements, would be expected to exhibit some catalytic properties in hydrocarbon conversion reactions. The formation of catalyst composites comprising rhenium in various concentrations, supported on suitable bases, for use in reforming reactions, is well known. Refer, e.g., to R. H. Blom, V. Kollonitsch and C. H. Kline, Ind. & Eng. Chem., v. 54, 16–22 (1962); and to A. V. Blackham, R. R. Blishline and L. S. Merrill, Ind. & Eng. Chem., Prod. Res. Develop., 4(4), 269–73 (1965) (Eng.). Platinum, however, is a more active metal for reforming even in very low concentrations, and since it has been used for this purpose for many years, the per se use of rhenium as a reforming catalyst has received virtually no attention by operations groups, and only limited attention by research groups. Considerable interest has been shown, however, in compositions which include rhenium as a component of a metallic mixture.

A composite catalyst which includes mixtures of platinum and rhenium, supported, e.g., on a coke base, has thus shown promise as a reforming catalyst and, in fact, the bimetallic mixture has shown greater activity in dehydrogenation of cyclohexane than either metallic component alone. H. Mueller and K. H. Schnabel, Z. Chem., 5, pp. 313–314 (1965). With regard to the use of this specific bimetallic composition in reforming, reference is also made to recently issued U.S. Pats. 3,415,737 to H. E. Kluksdahl and 3,434,960 to R. L. Jacobson et al. These patents thus disclose composites formed of platinum-rhenium compositions supported on various bases. Rhenium has, in fact, been suggested for combination with Group VIII noble metals generally for use in reforming, including specifically palladium. R. H. Blom and C. H. Kline—Try Rhenium in Your Catalyst Formulas, Hydrocarbon Processing and Petroleum Refiner, 42(10), pp. 132–134 (1963).

Rhenium per se is known to exhibit a high degree of cracking activity. H. Prinzler and H. Klotzche, Wiss. Z. Tech. Hochoch. Chem. Leuna-Morseburg, 3, 329–33 (1960–61); and H. Prinzler and W. Richter, Wiss. Z. Tech. Hochsch. Chem. Leuna-Morseburg, 2, 465 (1959–1960). The cracking activity of rhenium has been further enhanced by the addition of one or more other metals or compounds. In U.S. 3,278,418 to W. B. Wilson, the hydrocracking activity of a catalyst comprising rhenium on, e.g., silica alumina, is thus shown to be quite good, but the hydrocracking activity of the catalyst is shown to be greatly enhanced by the addition of a Group I–B metal of the Periodic Table, viz., silver, to form a bimetallic composite in U.S. Pat. 3,389,965 it is disclosed that the oxide of a Group I–B metal, viz., gold oxide, added to rhenium, also increases the rate of hydrocarbon conversion, in the presence of water or steam, to produce a gaseous mixture of hydrogen, carbon monoxide, carbon dioxide, methane and possibly lower boiling hydrocarbons. Thus, it is known that the addition of Group I–B metals, or compounds, enhances the cracking activity of rehenium.

The hydrocracking activity of rhenium is sufficiently vigorous, in fact, that even when used as a component of a bimetallic composition for reforming, the initial hydrocracking activity has remained a problem. For example, in U.S. Pats. 3,438,888 to B. Spurlock and 3,449,237 to R. L. Jacobson et al., it has been disclosed that pretreatment of composite catalysts comprising supported platinum-rhenium mixtures is necessary to suppress the initial adverse hydrocracking activity.

It has now been discovered that gold can be incorporated with rhenium to suppress the hydrocracking activity of rhenium. This is quite unexpected for heretofore Group I–B metals have enhanced the hydrocracking activity of rhenium, supra. Quite unexpectedly, also, it has been found that rhenium-gold compositions are far more catalytically active for reforming naphthas than either metal component alone, even under corresponding conditions.

The metal components are supported on suitable bases, and are employed in concentrations ranging preferably from about 0.01 percent to about 10 percent rhenium and from about 0.01 percent to about 10 percent gold, and more preferably from about 0.1 percent to about 5 percent rhenium and from about 0.1 percent to about 5 percent gold, based on the total weight of the catalyst composition. The metallic components are preferably employed in rhenium-to-gold molar ratios ranging from about 1:10 to about 10:1 and more preferably in molar ratios ranging from about 1:2 to about 2:1, a composition comprising a molar ratio of 1:1 having been found particularly satisfactory. While applicant does not desire to be bound by a specific theory on mechanism, it is believed that the active catalyst comprises an alloy of rhenium and gold, and hence the rhenium-gold compositions are described in terms of metallic metal.

Suitably, mildly or moderately acidic refractory oxides are employed as supports, e.g., silica, silica alumina, magnesia, thoria, boria, titania, zirconia, various spinels and the like, including in particular alumina which is preferred. High surface area catalysts, or catalysts having surface areas ranging upwardly from about 200 square meters per gram are preferred. In particular, catalysts having surface areas ranging from about 300 to about 600 square meters per gram prove quite satisfactory.

In formation of the more active catalysts, refractory inorganic oxides of desired particle size distribution, in dry state, can be contacted, admixed, or otherwise incorporated with a metal-containing solution, or solutions, and thereby impregnated. The refractory inorganic oxide can thus be pilled, pelleted, beaded, or extruded, alone or in admixture with other materials, and dried and crushed to form particles of desired size ranging, e.g., from about 0.1 to about 0.4 inch, and preferably from about 0.2 to about 0.3, average diameter. The material can then be treated by contact with a solution containing the desired amount of rhenium and gold, or treated sequentially by contact with a solution containing one metal and then the other, in the desired amounts. On the other hand, larger particles can be so-treated and then crushed to the desired size. The particulate mass, in either instance, can be dried and, calcined, and contacted with hydrogen, in situ or ex situ, to reduce the salt. Suitably, also, the catalyst composite can be formed by adding together suitable reagents such as salts of rhenium and gold, and ammonium hydroxide or ammonium carbonate, and a salt of alumina such as aluminum chloride and aluminum sulfate to form aluminum hydroxide. The aluminum hydroxide containing the salts of rhenium and gold can then be heated, dried, and simultaneously converted to alumina, impregnated with rhenium and gold salts. The material can then be calcined and then hydrogen-treated, in situ or ex situ, to reduce the salts and complete the formation of the catalyst composite.

The rhenium and gold can be added in essentially any soluble form of the respective metal, together in the same solution or in sequence, as e.g., soluble salts, acids or other form of compounds. Rhenium can thus be added as an aqueous solution of perrhenic acid, or as the solid ammonium, sodium and potassium salts, halide, oxyhalide, oxide or carbonyl salt dissolved in water. Addition of perrhenic acid, and these salts, dissolved in organic solvents, e.g., alcohols, bases or other solvents, is also permissible. A wide variety of such compounds is disclosed, e.g., in Rhenium Chemicals, Their Properties and Applications, by W. H. Davenport, J. W. Spelman, and H. J. Vaeth (copyright 1969, Cleveland Refractory Metals). Gold can also be added as an acid or aqueous solution of gold halide, e.g., auric trichloride, chloroauric acid, and the like; gold oxide, e.g., auric oxide; gold sulfide, e.g., aurous sulfide and the like. Gold can also be added as metal salt, e.g., sodium aurous cyanide, disodium aurothiomalate and the like.

A suitable feed, e.g., a naphtha, either virgin or cracked, Fischer-Tropsch or mixtures thereof, is contacted at reforming conditions in the presence of hydrogen with a catalyst composite including the support which contains catalytically active amount of rhenium and gold. Typical feed stream hydrocarbon molecules are those containing from about 5 to about 12 carbon atoms, or more preferably from about 7 to about 9 carbon atoms. Naphthas, or petroleum fractions boiling within the range of from about 80° F. to about 450° F., and preferably from about 125° F. to about 375° F., contain hydrocarbons of carbon numbers within these ranges. Typical fractions thus usually contain from about 20 to about 80 volume percent of paraffins, both normal and branched, which fall in the range of about $C_5$ to $C_{12}$, from about 20 to about 80 volume percent of naphthenes falling within the range of from about $C_6$ to $C_{12}$, and about 5 through about 20 volume percent of the desirable aromatics falling within the range of from about $C_6$ to $C_{12}$.

While it is most desirable to treat a petroleum fraction, such as those described above, essentially any hydrocarbon fraction containing paraffins, naphthenes, and the like, can be converted by means of the catalyst at temperatures ranging from about 600 to about 1050° F., and preferably at temperatures ranging from about 850 to about 1000° F. Pressures ranging from about 50 to about 750 p.s.i.g., and preferably from about 100 to about 250 p.s.i.g. are generally employed.

The reactions are conducted in the presence of hydrogen to suppress side reaction normally leading to the formation of unsaturated carbonaceous residues, which can cause deactivation of the catalyst. The hydrogen rate, once-through or recycle, is generally within the range of from about 1000 to about 12,000 s.c.f./bbl., and preferably within the range of from about 2000 to about 10,000 s.c.f./bbl. The feed stream, in admixture with hydrogen, is passed over the catalyst at space velocities of about 0.1 to 25 w./w./hr., and preferably from about 1.0 to 5.0 w./w./hr.

Conditions such as described readily produce reforming reactions, the most basic of which are (1) aromatization or dehydrogenation as typified by the removal of hydrogen from naphthenes to form corresponding aromatic hydrocarbons; (2) structural rearrangement, ring expansion, e.g., the formation of methylcyclohexane from ethylcyclopentane, or isomerization, e.g., as where normal paraffins form branched-chain paraffins; (3) dehydrocyclization of paraffins to form aromatics and the like.

The invention will be more fully understood by reference to the following selected nonlimiting examples and comparative data which illustrate its more salient features. All parts are given in terms of weight except as otherwise specified.

To provide the highly active catalysts for these examples, 1 part of particulate alumina, 14 to 35 mesh average particle size (Tyler), is slurried in 4 parts of water. A dilute solution containing both rhenium (as perrhenic acid) and gold (as auric chloride) is then added and the resultant solution stirred for one hour to assure impregnation. The solids are then separated from the solution by filtration, and then dried in a circulating air oven at about 220° F.

Dry catalyst is charged to a pressurized downflow reactor to provide a fixed bed. Liquid hydrocarbon feed and hydrogen are mixed at the entrance to the reactor, and the desired operating temperature is reached by the time the reactants enter the upper portion of the bed. The products are withdrawn from the reactor, the $C_5^+$ product condensed at 60° F. and 50 p.s.i.g., accumulated, then withdrawn from the accumulator and analyzed.

EXAMPLE 1

A partially reformed virgin naphtha 85 octane F–1 clear, having an API gravity of 48.3°, of composition comprising 39 percent paraffins (including 2% cycloparaffins) and 61 percent aromatics is fed into the reactor at a space velocity of 2.3 v./v./hr., contacted with a catalyst composite consisting of 1 weight part rhenicm and 1 weight part gold supported on an alumina base having a surface area of 217 m.²/gm., and the naphtha reformed at 200 p.s.i.g. and 952° F. hydrogen gas is fed into the reaction at the rate of 4000 s.c.f./bbl. of feed.

The $C_5^+$ product withdrawn from the reactor is analyzed and found to be 99.3 octane F–1 clear. The $C_5^+$ liquid recovery is 82.5%, based on initial feed, and the API gravity of the product is 42.3.

EXAMPLE 2

When the foregoing example is repeated under essentially the same conditions, except that the catalyst composite is one containing 0.5 weight part rhenium and 0.5 weight part gold, the $C_5^+$ product withdrawn from the reactor and analyzed has a 99.0 octane F–1 clear. Approximately 78% of the $C_5^+$ liquid product is recovered and the product has an API gravity of 41.6°.

The following demonstrations show the advantages achieved pursuant to the practice of the present invention by utilizing catalyst composites containing only the individual metal species, as contrasted with a bimetallic mixture of the metals. Thus, the foregoing example is repeated under essentially the same conditions, but utilizing in a first instance (Demonstration 1) a catalyst composite comprising 0.5 gold on an alumina base. And, in a second instance (Demonstration 2), a catalyst composite comprising 0.4 percent rhenium on an alumina base. The results are tabulated below.

| Demonstration No.: | Octane, F–1 clear |
| --- | --- |
| 1 | 90.8 |
| 2 | 92.6 |

It is thus to be observed that the catalyst composites of this invention, those containing a porous support and catalytically active amounts of rhenium and gold, are very highly active, particularly as compared to the use of the individual components alone. Moreover, it is found coke formation is quite low, and stability quite high. Good selectivity is maintained throughout the duration of the run.

To control the rate of cracking it is often desirable to add halogen, particularly chlorine, to the catalyst composite. Generally, therefore, from about 0.5 to about 1.5 weight percent, and preferably from about 0.2 to about 0.8 percent, based on the weight of the total catalyst composite, aer added during manufacture of the catalyst, during regeneration or in situ during normal reforming operations.

It is apparent that various modifications and changes can be made without departing the spirit and scope of the present invention, an outstanding feature is that the octane quality of various hydrocarbon feedstocks can be upgraded and improved at relatively low pressures.

Having described the invention, what is claimed is:

1. A process for improving the octane number of naphtha comprising contacting said naphtha at reforming conditions, at pressures ranging from about 50 p.s.i.g. to about 750 p.s.i.g., and at temperatures ranging from about 600 to about 1050° F., in the presence of hydrogen, hydrogen rates ranging from about 1000 to about 12,000 s.c.f./bbl. and space velocities ranging from about 0.1 to 25 w./w./hr., to produce reactions, the most basic of which are dehydrogenation of naphthenes to form aromatics, structural rearrangement and ring expansion, and dehydrocyclization of paraffins to form aromatics, with a highly active catalyst composite including a porous inorganic oxide support and catalytically active amounts of rhenium and gold, in concentration ranging from about 0.1 to about 10 weight percent rhenium and from about 0.1 to about 10 weight percent gold.

2. The process of claim 1 wherein the said catalyst composite has a surface area greater than about 200 square meters/gram.

3. The process of claim 1 wherein the ratio of rhenium-to-gold ranges from about 1:10 to about 10:1.

4. The process of claim 3 wherein the rhenium-to-gold ratio ranges from about 1:2 to about 2:1.

5. The composition of claim 4 wherein the ratio is about 1:1.

6. The process of claim 1 wherein the temperature ranges from about 850° F. to about 1000° F.

7. The process of claim 1 wherein the feed is a petroleum fraction boiling between about 80° F. and 450° F.

8. The process of claim 7 wherein the boiling range of the petroleum fraction is from about 125° F. to about 375° F.

9. The process of claim 1 wherein the hydrogen rate ranging from about 2000 to about 10,000 s.c.f./bbl., and the feed stream, in admixture with hydrogen, is passed over the catalyst at space velocities from about 1.0 to 5.0 w./w./hr.

10. The process of claim 1 wherein the yield of $C_5^+$ liquid product ranges above about 78%.

11. The process of claim 10 wherein the F–1 clear octane of the product of the reaction is above about 99.

12. The process of claim 1 wherein the catalyst composite contains from about 0.5 to about 1.5 weight percent halogen, based on the weight of the total catalyst composite.

13. The process of claim 12 wherein the halogen is chlorine.

14. The process of claim 13 wherein the catalyst composite contains from about 0.2 to about 0.8 weight percent chlorine.

References Cited

UNITED STATES PATENTS

| 1,913,940 | 6/1933 | Mittasch et al. | 208—134 |
| 2,677,649 | 5/1954 | Kirshenbaum et al. | 208—135 |
| 2,911,357 | 10/1959 | Myers et al. | 208—138 |
| 3,389,965 | 6/1968 | Ruiter et al. | 252—439 |

OTHER REFERENCES

Blom et al.: "Hydrocarbon Processing and Petroleum Refiner," October 1963, vol. 42, No. 10, pp. 132–134.

HERBERT LEVINE, Primary Examiner

U.S. Cl. X.R.

252—466 R